(12) United States Patent
Nakai et al.

(10) Patent No.: US 8,138,698 B2
(45) Date of Patent: Mar. 20, 2012

(54) MOTOR ROTATION IRREGULARITY DETECTION CIRCUIT

(75) Inventors: Kazumasa Nakai, Tokyo (JP); Masayuki Ota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 490 days.

(21) Appl. No.: 12/498,019

(22) Filed: Jul. 6, 2009

(65) Prior Publication Data

US 2010/0019706 A1 Jan. 28, 2010

(30) Foreign Application Priority Data

Jul. 24, 2008 (JP) .................................. 2008-190417

(51) Int. Cl.
*H02P 6/16* (2006.01)

(52) U.S. Cl. ......... 318/400.04; 318/400.06; 318/400.32; 318/638

(58) Field of Classification Search ................. 318/638, 318/400.03, 400.04, 400.05, 400.06, 400.21, 318/400.32

See application file for complete search history.

(56) References Cited

U.S. PATENT DOCUMENTS

| 3,569,808 A * | 3/1971 | Goto ............................ 388/820 |
| 3,668,492 A * | 6/1972 | Konishi et al. ................ 388/820 |
| 4,999,557 A * | 3/1991 | Inoue ............................ 318/609 |
| 5,493,192 A * | 2/1996 | Nihei et al. ................. 318/568.2 |
| 7,960,934 B2 * | 6/2011 | Benson et al. ................ 318/564 |
| 2008/0042613 A1 | 2/2008 | Aizawa et al. |

FOREIGN PATENT DOCUMENTS

| JP | 9-166610 A | 6/1997 |
| JP | 2008-11628 A | 1/2008 |

* cited by examiner

*Primary Examiner* — Bentsu Ro
*Assistant Examiner* — Thai Dinh
(74) *Attorney, Agent, or Firm* — Birch, Stewart, Kolasch & Birch, LLP

(57) ABSTRACT

A motor rotation irregularity detection circuit includes a first integrator for integrating a rotation detection signal that is output from a driver of a sensor-less motor; a differentiator for outputting a difference between a binary signal based on the integral in the first integrator and the rotation detection signal; a second integrator for integrating an output signal of the differentiator; a comparator for making a comparison between the integral in the second integrator and a reference voltage to output an irregularity detection signal; and an output terminal for outputting a signal coming from the comparator.

6 Claims, 5 Drawing Sheets

# MOTOR ROTATION IRREGULARITY DETECTION CIRCUIT

BACKGROUND OF THE INVENTION

1. Field of the Invention

The present invention relates to a motor rotation irregularity detection circuit.

2. Description of the Background Art

Conventionally, some motor rotation irregularity detection circuits charge, through a charging circuit, a pulse-width modulation (hereinafter referred to as "PWM") signal that is generated based on a signal coming from a motor's rotation detector (or magnetic sensor) and in response to the motor's rotation period, and then output an alarm signal indicating rotational irregularities, when the voltage in the charging circuit falls below a reference voltage (c.f., Japanese Patent Application Laid-open No. 9-166610 (Page 2; FIG. 9)).

The aforementioned motor rotation irregularity detection circuits use a PWM signal generated based on a signal coming from the rotation detector provided in the motor. A sensor-less motor with no rotation detector, on the other hand, outputs, in addition to a PWM signal, either a high-level (hereinafter referred to as "H-level") or low-level (hereinafter referred to as "L-level") fixed signal, which depends on the timing of such locking when the motor is locked or semi-locked. At this time, with the input of an H-level fixed signal, the voltage in the charging circuit always exceeds a reference voltage, which poses the problem that an alarm signal indicating rotational irregularities may not be output so that irregularities may be assessed as normal.

SUMMARY OF THE INVENTION

It is an object of the present invention to provide a motor rotation irregularity detection circuit that is capable of reliably detecting rotational irregularities, even for an H-level fixed signal that is output when the motor is locked or semi-locked.

The motor rotation irregularity detection circuit according to the present invention includes a first integrator, a differentiator, a second integrator, and a signal output unit. The first integrator integrates a rotation detection signal representing the rotation of the motor. The differentiator outputs the difference between a binary signal based on an integral in the first integrator and the rotation detection signal. The second integrator integrates the output signal of the differentiator. The signal output unit outputs an irregularity detection signal when the integral in the second integrator falls below a reference voltage.

Accordingly, a highly reliable motor rotation irregularity detection circuit can be provided, which is capable of reliably detecting rotational irregularities, not only for a PWM signal but also for any fixed signal that is output when the motor is locked or semi-locked.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
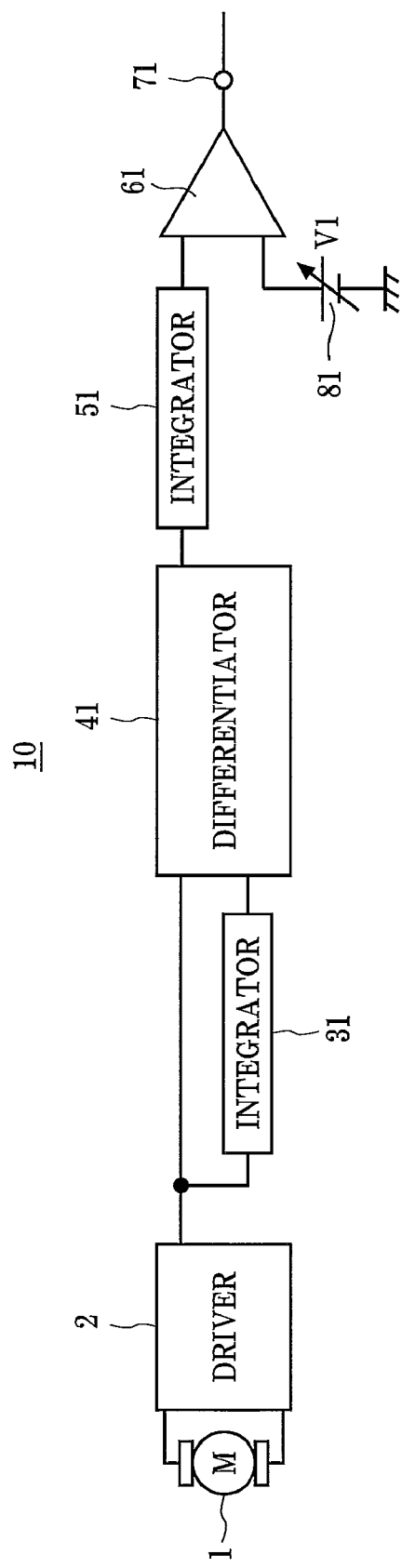
FIG. 1 is a block diagram of a motor rotation irregularity detection circuit according to a first preferred embodiment of the present invention.
Figure 2:
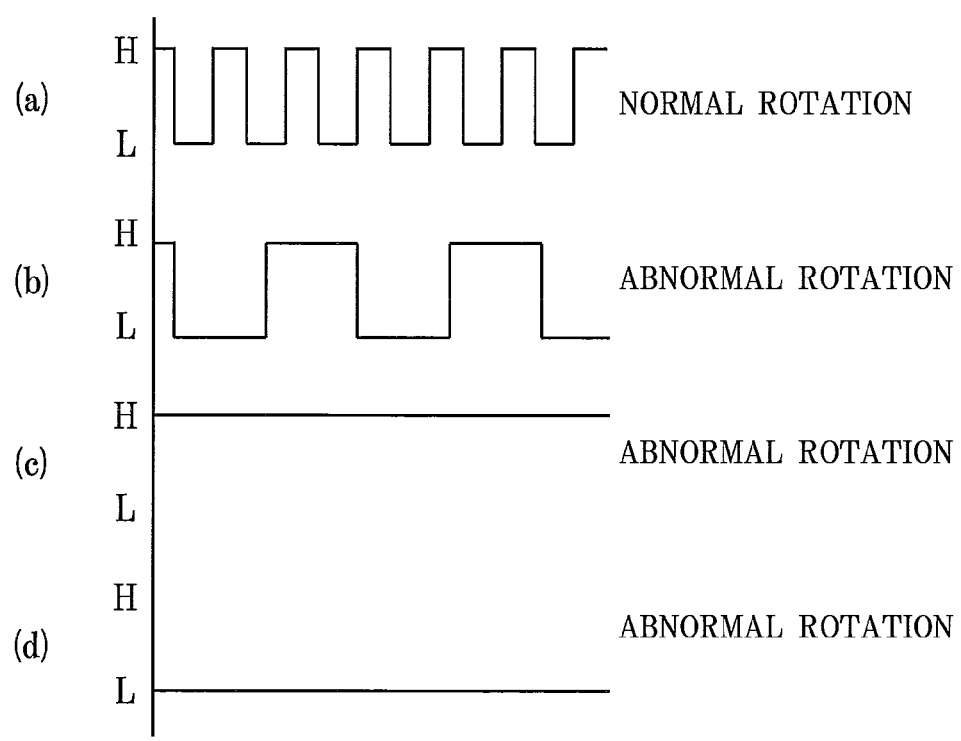
FIG. 2 is a waveform chart of a motor rotation detection signal that is input into the motor rotation irregularity detection circuit according to the first preferred embodiment of the present invention.
Figure 3:
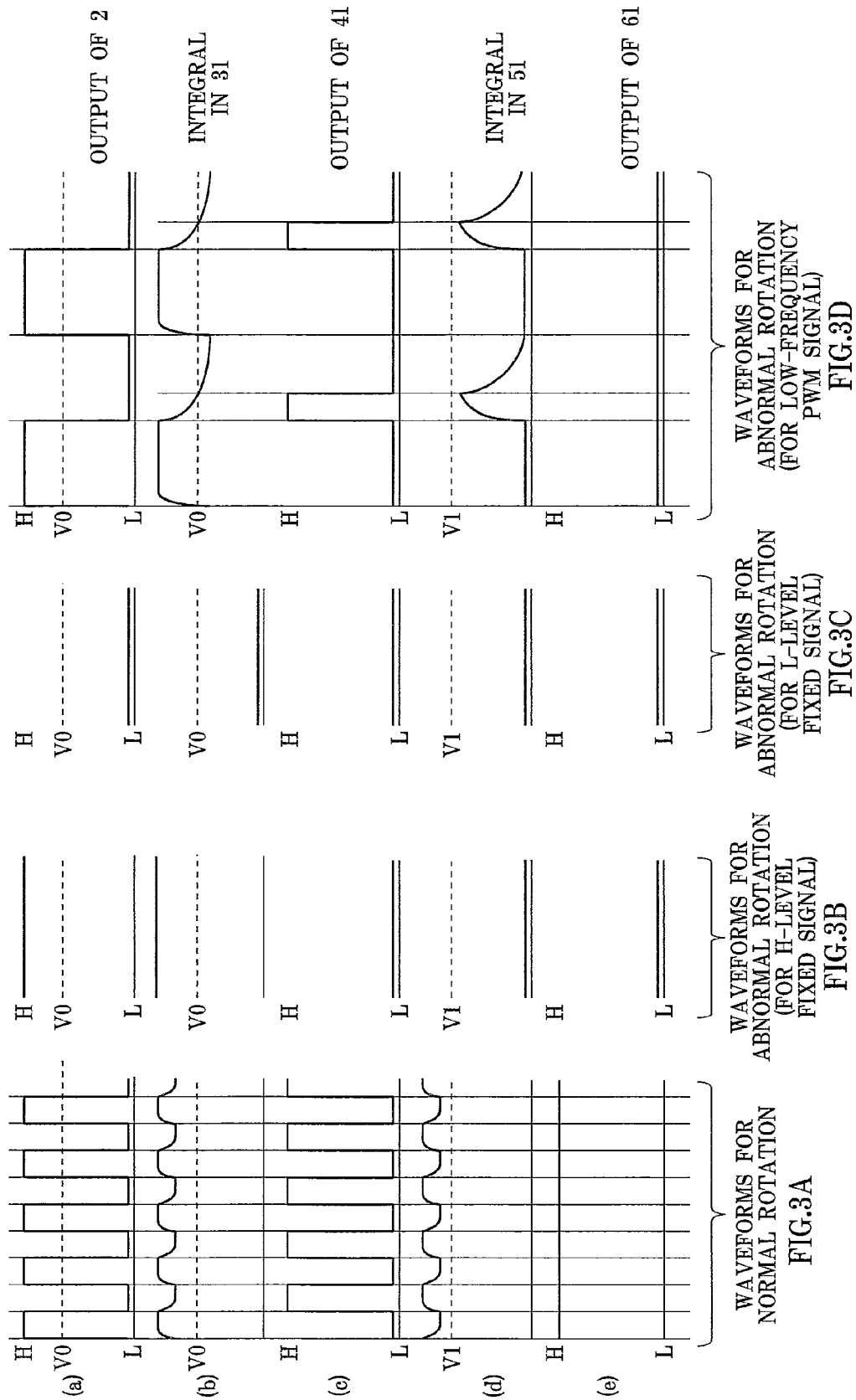
FIGS. 3A to 3D are waveform charts illustrating the operations of the motor rotation irregularity detection circuit according to the first preferred embodiment of the present invention, respectively.

FIG. 1 is a block diagram of a motor rotation irregularity detection circuit according to a first preferred embodiment of the present invention. FIG. 2 is a waveform chart of a signal that is input from a motor to the motor rotation irregularity detection circuit according to the present invention, and FIG. 3 is a waveform chart illustrating the operations of the motor rotation irregularity detection circuit according to the first preferred embodiment of the present invention.

Referring first to FIG. 1, the configuration of the motor rotation irregularity detection circuit according to the first preferred embodiment is described. The motor rotation irregularity detection circuit 10 in FIG. 1 includes a first integrator 31 for integrating a rotation detection signal that is output from a driver 2 of a sensor-less motor 1, a differentiator 41 for outputting a difference between a binary signal based on an integral in the first integrator 31 and the rotation detection signal, a second integrator 51 for integrating an output signal of the differentiator 41, a comparator 61 that is a signal output unit for making a comparison between an integral in the second integrator 51 and a reference voltage V1 to output an irregularity detection signal, and an output terminal 71 for outputting a signal coming from the comparator 61. The motor rotation irregularity detection circuit 10 also includes a voltage regulator 81 for regulating the reference voltage V1 of the comparator 61.

The first integrator 31 and the second integrator 51 are each composed, for example, of a resistor and a capacitor or of a coil and a capacitor.

The differentiator 41 converts input signals into binary and outputs a difference therebetween. It is configured to output an H-level signal only when the two inputs are different, through the use of an EXCLUSIVE-OR element such as an EXCLUSIVE-OR circuit or a differential-input circuit, etc. It is also configured to output an L-level signal when receiving any combination other than the combination of a dc voltage charging the first integrator 31 and a PWM signal output from the driver 2.

The comparator 61 is configured to output an H-level signal when the integral in the second integrator 51 exceeds the reference voltage V1 and output an L-level signal when the integral falls below the reference voltage V1. The voltage regulator 81 for regulating the reference voltage V1 of the comparator 61 is, for example, a variable voltage transformer.

During normal rotation of a motor, the driver 2 of a sensor-less motor 1 outputs a PWM signal that alternates between H- and L-levels in response to the motor's rotation period as illustrated in (a) of FIG. 2. During abnormal rotation (low-speed rotations) of the motor, on the other hand, the driver 2 of the sensor-less motor 1 outputs a PWM signal in response to the low-speed rotation period as illustrated in (b) of FIG. 2; and when the motor is locked or semi-locked, the driver 2 outputs either an H-level fixed signal, as illustrated in (c) of FIG. 2, or an L-level fixed signal, as illustrated in (d) of FIG. 2, in response to the timing of such locking.

Next, the operations of the motor rotation irregularity detection circuit according to the first preferred embodiment are described. Referring first to FIG. 3A, operation during normal rotation of the motor is described. During normal rotation of the motor, as illustrated in (a) of FIG. 3A, the driver 2 outputs a PWM signal responsive to the number of motor rotations. This signal is integrated by the first integrator 31. Since the first integrator 31 accumulates charge only at the input of an H-level signal and discharges at the input of an L-level signal, the integral in the first integrator 31 exhibits a waveform as illustrated in (b) of FIG. 3A.

This integral in the first integrator 31 and the PWM signal output from the driver 2 of the sensor-less motor 1 during normal operation are input into the differentiator 41, in which voltages are converted into and recognized as binary data, namely a voltage equal to or higher than the threshold voltage V0 as being of an H level and a voltage less than the threshold value V0 as being of an L level. The differentiator 41 obtains a difference therebetween to output a waveform that alternates between H and L levels as illustrated in (c) of FIG. 3A.

The output signal of this differentiator 41 is integrated by the second integrator 51. Since, like the first integrator 31, the second integrator 51 accumulates charge only at the input of an H-level signal and discharges at the input of an L-level signal, the integral in the second integrator 51 exhibits a waveform as illustrated in (d) of FIG. 3A.

It is noted herein that, because the reference voltage V1 of the comparator 61 is regulated by the voltage regulator 81 to always fall below the integral in the second integrator 51 as illustrated in (d) of FIG. 3A, the comparator 61 outputs an H-level fixed signal as illustrated in (e) of FIG. 3A. Consequently, the output terminal 71 always outputs an H-level fixed signal.

In this way, during normal rotation of the motor, the motor rotation irregularity detection circuit 10 always outputs an H-level signal from its output terminal 71.

Referring then to FIGS. 3B to 3D, the operations during abnormal rotation of the motor are described. FIG. 3B illustrates the operation when the driver 2 outputs an H-level fixed signal when the sensor-less motor 1 is locked or semi-locked. The H-level fixed signal as illustrated in (a) of FIG. 3B that is output from the driver 2 is integrated by the first integrator 31. Since the first integrator 31 receives this H-level fixed signal, an integral in the first integrator 31 is maintained at a saturation voltage of the first integrator 31 as illustrated in (b) of FIG. 3B.

Then, the differentiator 41 receives the integral in the first integrator 31 and the H-level fixed signal that is output from the driver 2 of the sensor-less motor 1. Since the differentiator 41 recognizes a voltage equal to or higher than the threshold value V0 as an H-level signal, both the integral in the first integrator 31 illustrated in (b) of FIG. 3B and the H-level fixed signal that is output from the driver 2 of the sensor-less motor 1 illustrated in (a) of FIG. 3B are recognized as H-level signals. The differentiator 41 obtains a difference between those signals to output an L-level fixed waveform as illustrated in (c) of FIG. 3B.

The output signal of the differentiator 41 is integrated by the second integrator 51. Since the output signal of the differentiator 41 is an L-level fixed signal, an integral in the second integrator 51, which integrates a signal coming from the differentiator 41, is maintained at its lower limit voltage as illustrated in (d) of FIG. 3B.

Thus, as illustrated in (d) of FIG. 3B, the integral in this second integrator 51 always falls below the reference voltage V1 of the comparator 61, so that the comparator 61 outputs an L-level fixed signal as illustrated in (e) of FIG. 3B. Consequently, the output terminal 71 always outputs an L-level fixed signal.

FIG. 3C illustrates the operation when the driver 2 outputs an L-level fixed signal when the sensor-less motor 1 is locked or semi-locked. The L-level fixed signal as illustrated in (a) of FIG. 3C that is output from the driver 2 is integrated by the first integrator 31. Since the first integrator 31 receives the L-level fixed signal, an integral in the first integrator 31 is maintained at a lower limit voltage as illustrated in (b) of FIG. 3C.

The integral in this first integrator 31 and the L-level fixed signal that is output from the driver 2 of the sensor-less motor 1 are then input into the differentiator 41. Since the differentiator 41 recognizes a voltage lower than the threshold value V0 as an L-level signal, both the integral in the first integrator 31 illustrated in (b) of FIG. 3C and the L-level fixed signal illustrated in (a) of FIG. 3C, which is the signal output from the driver 2 of the sensor-less motor 1, are recognized as L-level signals. The differentiator 41 obtains a difference between those signals to output an L-level fixed waveform as illustrated in (c) of FIG. 3C.

The output signal of this differentiator 41 is integrated by the second integrator 51. Since the output signal of the differentiator 41 is an L-level fixed signal, the integral in the second integrator 51 is maintained at a lower limit voltage thereof as illustrated in (d) of FIG. 3C.

Since the integral in this second integrator 51 always falls below the reference voltage V1 of the comparator 61 as illustrated in (d) of FIG. 3C, the comparator 61 outputs an L-level fixed signal as illustrated in (e) of FIG. 3C. Consequently, the output terminal 71 always outputs an L-level fixed signal.

FIG. 3D illustrates the operation for the case where the driver 2 of the sensor-less motor 1 outputs a low-frequency PWM signal during abnormal rotation (low-speed rotations). During low-speed motor rotation, the driver 2 outputs a low-frequency PWM signal as illustrated in (a) of FIG. 3D. This PWM signal is integrated by the first integrator 31. Since the first integrator 31 accumulates charge only at the input of an H-level signal and discharges at the input of an L-level signal, the integral in the first integrator 31 exhibits a waveform as illustrated in (b) of FIG. 3D.

This integral in the first integrator 31 and the low-frequency PWM signal that is output from the driver 2 of the sensor-less motor 1 are then input into the differentiator 41 in which voltages are converted into and recognized as binary data, namely a voltage equal to or higher than the threshold voltage V0 is recognized as being of an H level and a voltage lower than the threshold voltage V0 is recognized as being of an L level. The differentiator 41 obtains a difference therebetween to output a waveform that alternates between H and L levels as illustrated in (c) of FIG. 3D.

The signal as illustrated in (c) of FIG. 3D that comes from the differentiator 41 is integrated by the second integrator 51. Since, like the first integrator 31, the second integrator 51 accumulates charge only at the input of an H-level signal and discharges at the input of an L-level signal, the integral in the second integrator 51 exhibits a waveform as illustrated in (d) of FIG. 3D.

Since, as illustrated in (d) of FIG. 3D, the integral in the second integrator 51 always falls below the reference voltage V1 of the comparator 61, the comparator 61 outputs an L-level fixed signal as illustrated in (e) of FIG. 3D. Consequently, the output terminal 71 always outputs an L-level fixed signal.

In this way, during abnormal rotation of the motor, the rotational irregularity detection circuit 10 always outputs an L-level fixed signal from its output terminal 71, even when the driver 2 of the sensor-less motor 1 outputs a signal that has any one of the waveforms illustrated in (b) to (d) of FIG. 2. Using such an L-level fixed signal as a rotational irregularity detection signal allows the circuit to properly assess even an H-level fixed signal that may be assessed as normal in a conventional circuit, as a rotational irregularity.

Although the waveform of a PWM signal that is output from the driver 2 varies depending on the specifications of the sensor-less motor 1, the aforementioned operations can be achieved by properly regulating the time constants of the first and second integrators 31 and 51 and the reference voltage V1 of the comparator 61 according to the specifications of the employed sensor-less motor 1.

Although in the above preferred embodiment an H-level signal is output when the integral in the second integrator 51 exceeds the reference voltage V1 of the comparator 61, and an L-level signal when the integral falls below the reference voltage V1, this may be vice versa: a L-level signal may be output when the integral in the second integrator 51 exceeds the reference voltage V1 of the comparator 61 and an H-level signal when the integral falls below the threshold voltage V1, in which case an H-level signal will be used as a rotational irregularity detection signal.

Although the present preferred embodiment illustrated the case where the driver of the sensor-less motor with no rotation detector outputs a rotation detection signal that is a PWM signal, the motor rotation irregularity detection circuit according to the present preferred embodiment is also applicable to a motor provided with a rotation detector, as long as the rotation detection signal is a PWM signal.

The present preferred embodiment illustrates the provision of the first integrator 31 for integrating a rotation detection signal coming from the sensor-less motor 1; the differentiator 41 for outputting a difference between a binary signal based on the integral in the integrator 31 and the rotation detection signal; the second integrator 51 for integrating the output signal of the differentiator 41; and the comparator 61 that is a signal output unit for outputting an irregularity detection signal when the integral in the second integrator 51 falls below the reference voltage V1. This provides a highly reliable motor rotation irregularity detection circuit that is capable of reliably detecting rotational irregularities in a motor even if not only a low-frequency PWM signal but also either an H-level or L-level fixed signal are output when the motor is locked or semi-locked.

Moreover, according to the present preferred embodiment, the provision of the voltage regulator 81 for regulating the reference voltage V1 of the comparator 61 (signal output unit) facilitates the regulation of the reference voltage V1 according to the specifications of the employed sensor-less motor 1.

Furthermore, according to the present preferred embodiment, since the rotation detection signal is output from the driver 2 of the sensor-less motor 1, it is not necessary to use any rotation sensor for sensing motor rotation.

Second Preferred Embodiment

Figure 4:
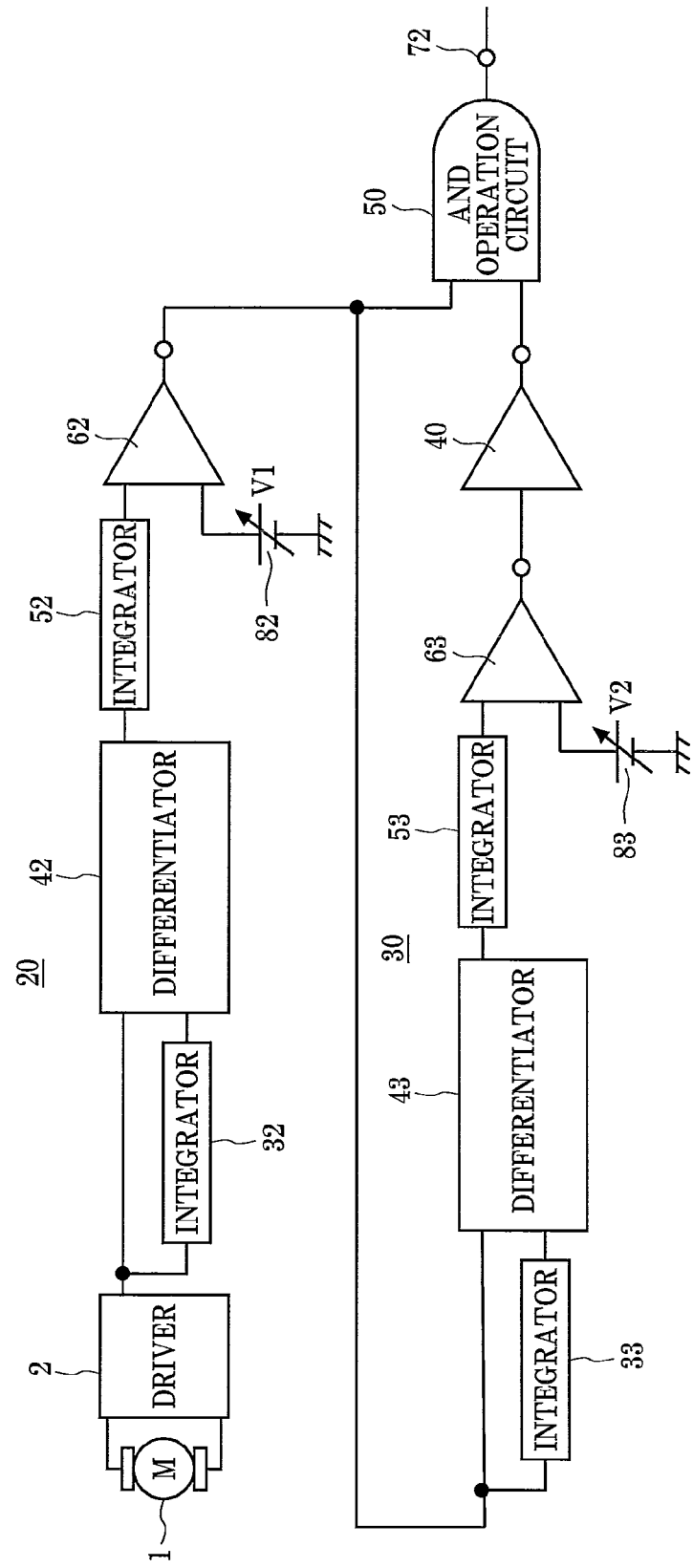
FIG. 4 is a block diagram of a motor rotation irregularity detection circuit according to a second preferred embodiment of the present invention.
Figure 5:
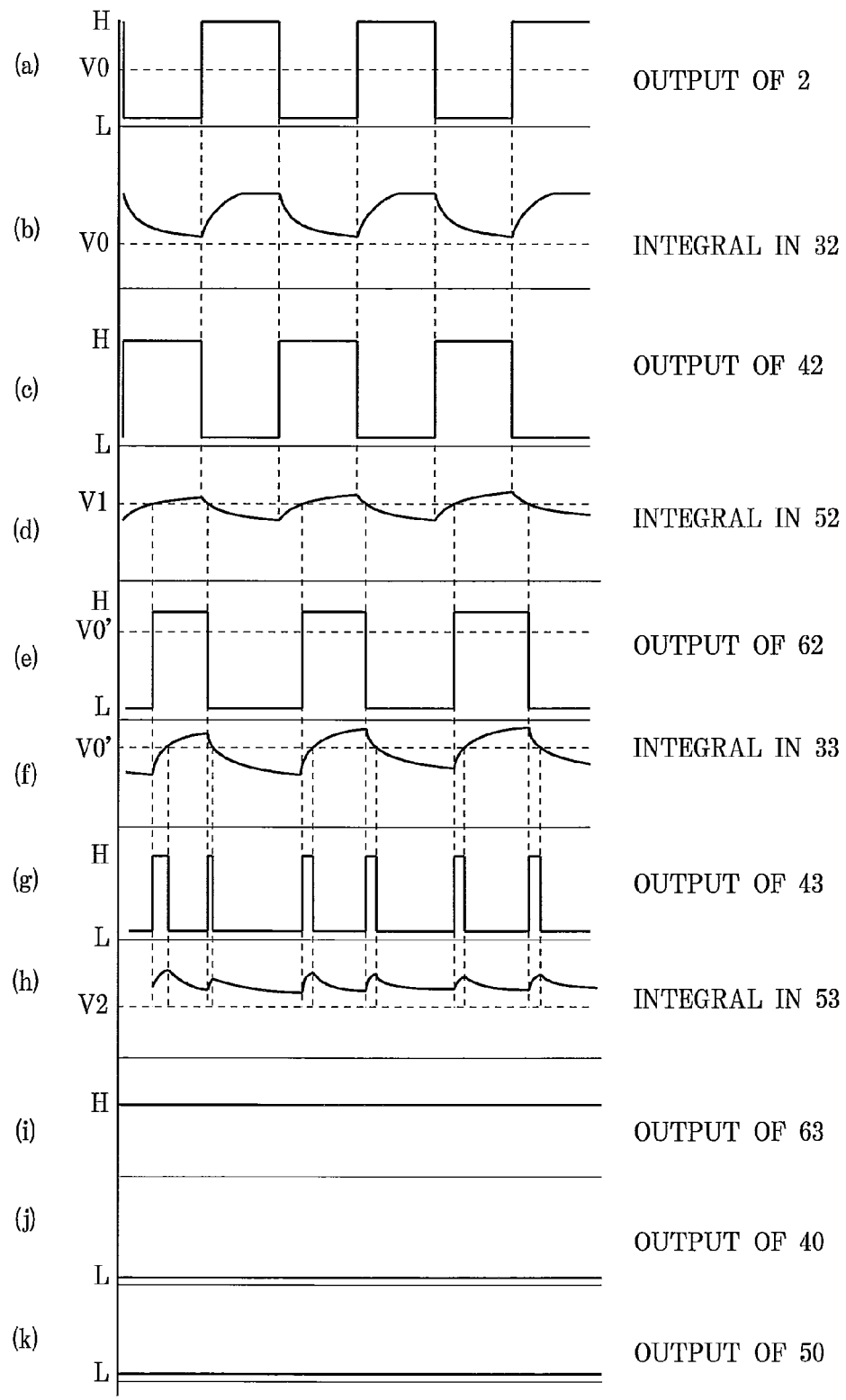
FIG. 5 is a waveform chart illustrating the operations of the motor rotation irregularity detection circuit according to the second preferred embodiment of the present invention.
Figure 4:
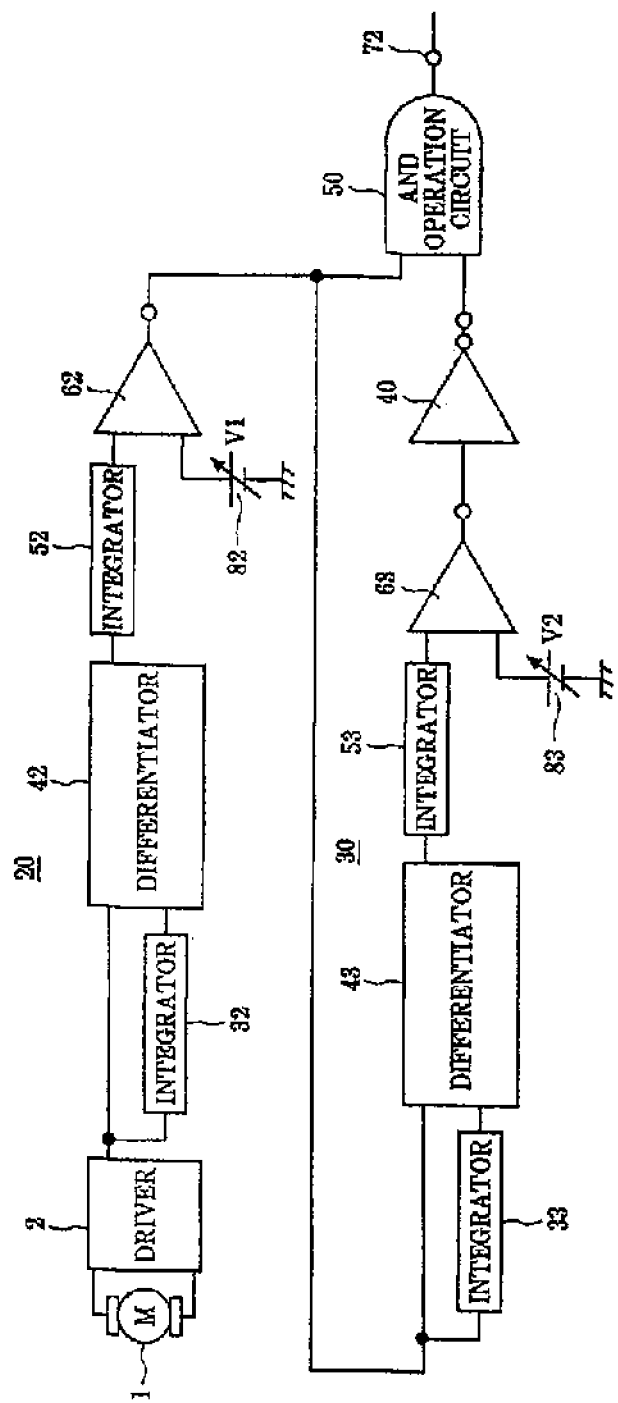
Figure 5:
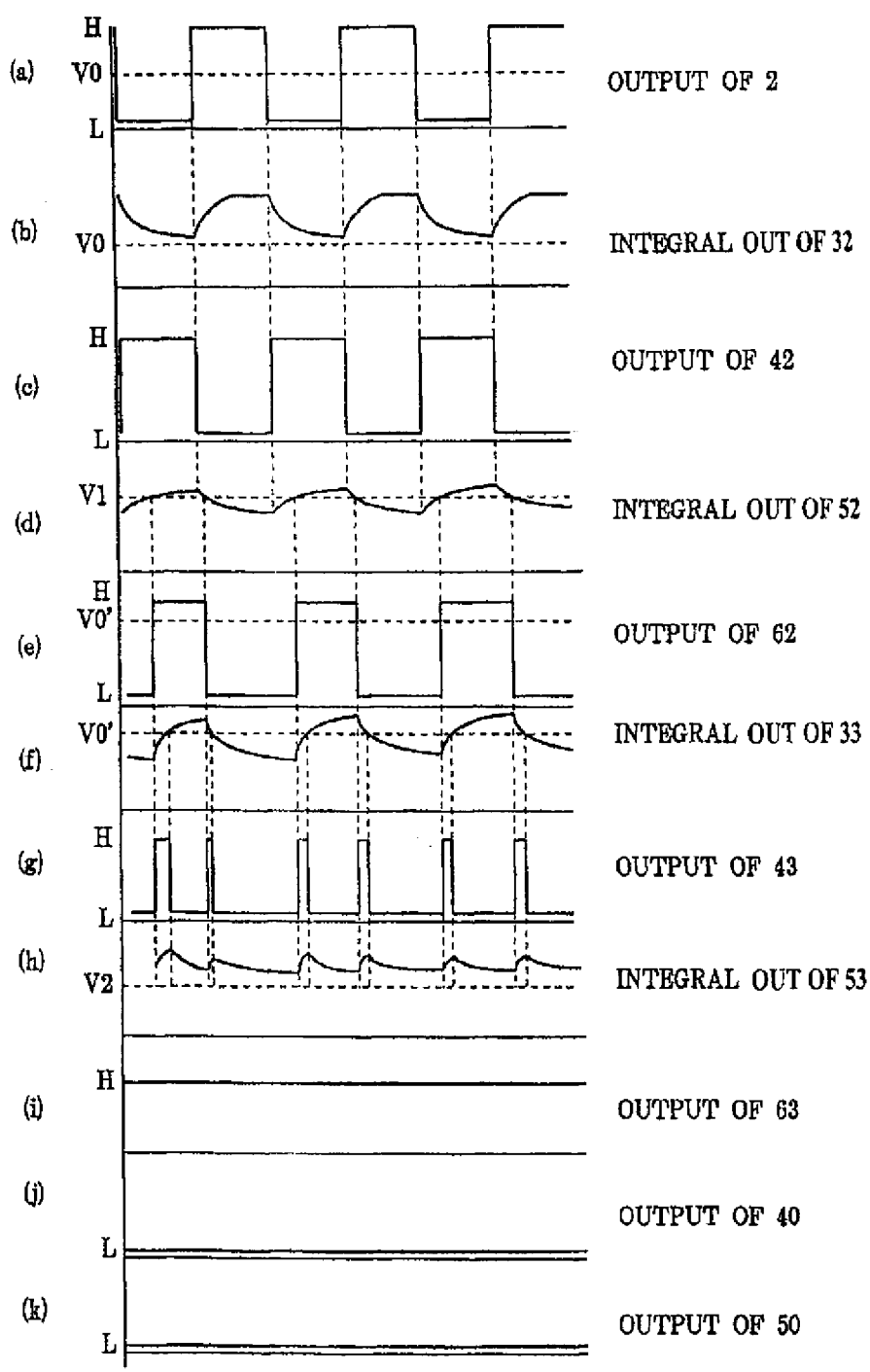

FIG. 4 is a block diagram of a motor rotation irregularity detection circuit according to a second preferred embodiment of the present invention. FIG. 5 is a waveform chart illustrating the operations of the motor rotation irregularity detection circuit according to the second preferred embodiment of the present invention.

Referring first to FIG. 4, the configuration of the motor rotation irregularity detection circuit according to the second preferred embodiment is described. The motor rotation irregularity detection circuit in FIG. 4 includes a circuit 20 and a circuit 30. The circuit 20 is identical in configuration to the circuit described in the first preferred embodiment, and it includes a first integrator 32 for integrating a rotation detection signal that is output from the driver 2 of the sensor-less motor 1; a first differentiator 42 for outputting a difference between a binary signal based on an integral in the first integrator 32 and the rotation detection signal; a second integrator 52 for integrating an output signal of the first differentiator 42; and a first comparator 62 (first signal output unit) for outputting an H-level signal when the integral in the second integrator 52 exceeds a first reference voltage V1 and outputting an L-level signal when the integral falls below the reference voltage V1. The circuit 30 includes a third integrator 33 for integrating an output signal of the first comparator 62; a second differentiator 43 for outputting a difference between an integral in the third integrator 33 and the output signal of the first comparator 62; a fourth integrator 53 for integrating an output signal of the second differentiator 43; and a second comparator 63 (second signal output unit) for outputting an H-level signal when an integral in the fourth integrator 53 exceeds a second reference voltage V2. The motor rotation irregularity detection circuit further includes an inverter 40 for inverting and outputting an output signal of the second comparator 63; an AND arithmetic circuit 50 (AND arithmetic unit) for computing a logical product of an output signal of the inverter 40 and the output signal of the first comparator 62; and an output terminal 72 for outputting a signal coming from the AND arithmetic circuit 50.

The motor rotation irregularity detection circuit also includes first and second voltage regulators 82 and 83 for regulating the first and second reference voltages V1 and V2, respectively. These voltage regulators 82 and 83 are, for example, variable voltage transformers.

The first to fourth integrators 32, 33, 52, and 53 are each composed, for example, of a resistor and a capacitor or of a coil and a capacitor, as in the first preferred embodiment.

The first and second differentiators 42 and 43 are, as in the first preferred embodiment, to convert input signals into binary data and output a difference therebetween. They are configured to output an H-level signal only when two inputs are different, through the use of an EXCLUSIVE-OR element such as an EXCLUSIVE-OR circuit or a differential-input circuit, etc. The first differentiator 42 is further configured to output an L-level signal when receiving any combination other than the combination of a dc voltage charging the first integrator 32 and a PWM signal that is output from the driver 2.

Referring then to FIG. 5, the operations of the motor rotation irregularity detection circuit according to the second preferred embodiment are described. FIG. 5 illustrates an operation when, during abnormal rotation (low-speed rotations) of the sensor-less motor 1, the driver 2 outputs a PWM signal having a lower frequency than the signal output during normal rotation. When the motor rotates at low speed or a protective circuit for the driver 2 is actuated, the driver 2 of the sensor-less motor 1 outputs a PWM signal having a lower frequency than the signal that is output during normal rotation as illustrated in (a) of FIG. 5. This PWM signal is integrated by the first integrator 32. Since the first integrator 32 accumulates charge only at the input of an H-level signal and discharges at the input of an L-level signal, the integral in the first integrator 32 exhibits a waveform as illustrated in (b) of FIG. 5.

This integral in the first integrator 32 and the output signal of the driver 2 of the sensor-less motor I are then input into the first differentiator 42, in which voltages are converted into and recognized as binary data, namely a voltage equal to or higher than the threshold value V0 as being of an H level and a voltage lower than the threshold value V0 as being of an L level. The differentiator 42 obtains a difference therebetween to output a waveform that alternates between H and L levels as illustrated in (c) of FIG. 5.

The signal coming from the first differentiator 42 is integrated by the second integrator 52. Since, like the first integrator 32, the second integrator 52 accumulates charge only at the input of an H-level signal and discharges at the input of an L-level signal, the integral in the second integrator 52 exhibits a waveform as illustrated in (d) of FIG. 5.

In the first preferred embodiment, the reference voltage V1 of the first comparator 62 is regulated to always fall below the integral in the second integrator 52. However, as in the present preferred embodiment, depending on the time constants of the first and second integrators 32 and 52, the integral in the second integrator 52 may straddle the line of the reference voltage V1 of the first comparator 62 as illustrated in (d) of FIG. 5. In such a case, the output of the first comparator 62 exhibits a waveform that alternates between H and L levels as illustrated in (e) of FIG. 5.

Such an output signal of the first comparator 62 is integrated by the third integrator 33. Since, like the first and second integrators 32 and 52, the third integrator 33 accumulates charge at the input of an H-level signal and discharges at the input of an L-level signal, the integral in the third integrator 33 exhibits a waveform as illustrated in (f) of FIG. 5.

The integral in the third integrator 33 and the output signal of the first comparator 62 are then input into the second differentiator 43, in which voltages are converted into and recognized as binary data, namely a voltage equal to or higher than the threshold value V0' as being of an H level and a voltage lower than the threshold value V0' as being of an L level. The second differentiator 43 obtains a difference between those signals to output a waveform as illustrated in (g) of FIG. 5.

This output signal of the second differentiator 43 is integrated by the fourth integrator 53. Since, like the first to third integrators 32, 52, and 33, the fourth integrator 53 accumulates charge at the input of an U-level signal and discharges at the input of an L-level signal, the integral in the fourth integrator 53 exhibits a waveform as illustrated in (h) of FIG. 5.

It is noted herein that, since the reference voltage V2 of the second comparator 63 is regulated by the second voltage regulator 83 to always fall below the integral in the fourth integrator 53, the output signal of the second comparator 63 is an H-level fixed signal as illustrated in (i) of FIG. 5.

The output signal of the second comparator 63 is then inverted by the inverter 40 and outputted as an L-level fixed signal as illustrated in (j) of FIG. 5.

This output signal of the inverter 40 illustrated in (j) of FIG. 5 and the output signal of the first comparator 62 illustrated in (e) of FIG. 5 are input into the AND arithmetic circuit 50. Since the inverter 40 outputs an L-level fixed signal, the AND arithmetic circuit 50 outputs an L-level fixed signal as illustrated in (k) of FIG. 5. Consequently, the output terminal 72 always outputs an L-level fixed signal.

In this way, during abnormal rotation of the motor, the driver 2 outputs a PWM signal having a lower frequency than the signal that is output during normal rotation. The configuration according to the present preferred embodiment thus allows the output terminal 72 to output an L-level fixed signal, even in the case where in the configuration of the first preferred embodiment, an H-level signal and an L-level signal are output alternately. Using such an L-level signal as a rotational irregularity detection signal allows rotational irregularities in a motor to be detected in the form of a more reliable signal.

When the driver 2 outputs either an H-level or an L-level fixed signal, the output signal of the first comparator 62 is an L-level fixed signal as in the first preferred embodiment. At this time, the output signal of the inverter 40 is an H-level fixed signal, so that the computation of a logical product of input signals in the AND arithmetic circuit 50 shows that the AND arithmetic circuit 50 outputs an L-level fixed signal.

On the other hand, when the driver 2 outputs a PWM signal responsive to the normal rotation period, the output signal of the first comparator 62 is an H-level fixed signal as in the first preferred embodiment. At this time, the output signal of the inverter 40 is an H-level fixed signal, so that the computation of a logical product of input signals in the AND arithmetic circuit 50 shows that the AND arithmetic circuit 50 outputs an H-level fixed signal.

The present preferred embodiment illustrates the provision of, in addition to the circuit 20 identical in configuration to the circuit described in the first preferred embodiment, a circuit 30 that includes a third integrator 33 for integrating the output signal of the first comparator 62 (first signal output unit), the second differentiator 43 for outputting a difference between a binary signal based on the integral in the third integrator 33 and the output signal of the first comparator 62 (first signal output unit), the fourth integrator 53 for integrating the output signal of the second differentiator 43, and the second comparator 63 (second signal output unit) for outputting an H-level signal when the integral in the fourth integrator 53 exceeds the second reference voltage V2; the inverter 40 for inverting and outputting the output signal of the second comparator 63 (second signal output unit); and the AND arithmetic circuit 50 (AND arithmetic unit) for computing a logical product of the output signal of the inverter 40 and the output signal of the first comparator 62. This allows the output terminal 72 to always output an H-level fixed signal during normal rotation of the motor and to always output an L-level fixed signal during abnormal rotation of the motor, thus providing a highly reliable motor rotation irregularity detection circuit capable of detecting rotational irregularities with more reliability.

Moreover, according to the present preferred embodiment, the provision of the first and second voltage regulators 82 and 83 for regulating the reference voltages V1 and V2 of the first and second comparators 62 and 63 (first and second signal output units) facilitates the regulation of the reference voltages V1 and V2 according to the specifications of the employed sensor-less motor 1.

While the invention has been shown and described in detail, the foregoing description is in all aspects illustrative and not restrictive. It is therefore understood that numerous modifications and variations can be devised without departing from the scope of the invention.

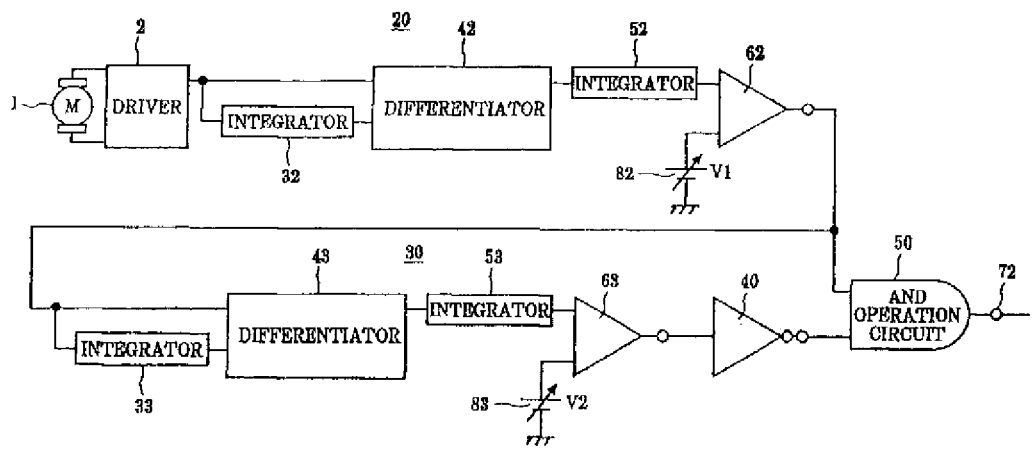

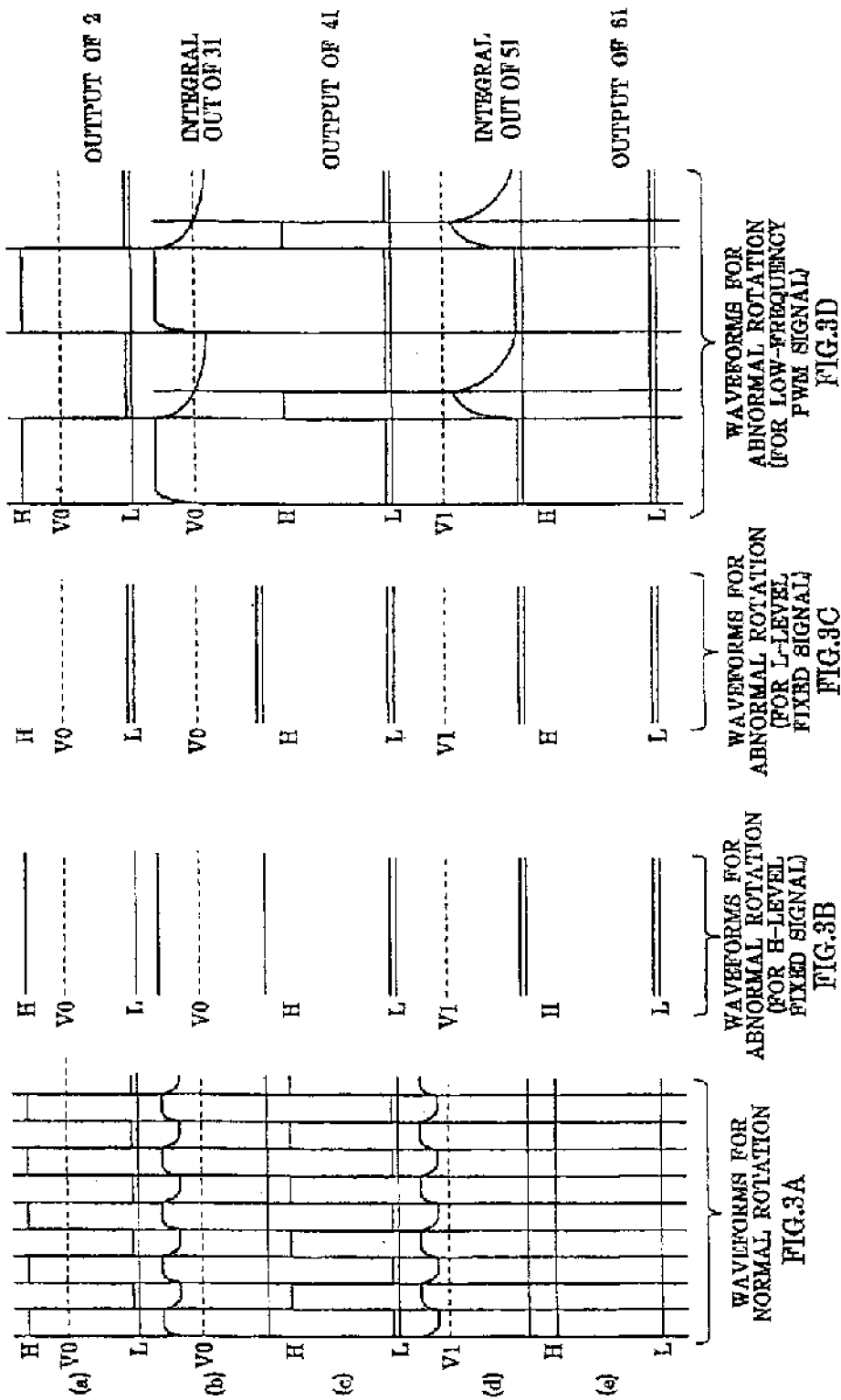

What is claimed is:

1. A motor rotation irregularity detection circuit comprising:
   a first integrator for integrating a rotation detection signal representing rotation of a motor;
   a differentiator for outputting a difference between a binary signal based on an integral in said first integrator and said rotation detection signal;

a second integrator for integrating an output signal of said differentiator; and a signal output unit for outputting an irregularity detection signal when an integral in said second integrator falls below a reference voltage.

2. The motor rotation irregularity detection circuit according to claim 1, further comprising:

a voltage regulator for regulating said reference voltage.

3. The motor rotation irregularity detection circuit according to claim 1, wherein said rotation detection signal is output from a driver of a sensor-less motor.

4. A motor rotation irregularity detection circuit comprising:

a first integrator for integrating a rotation detection signal representing the rotation of a motor;

a first differentiator for outputting a difference between a binary signal based on an integral in said integrator and said rotation detection signal;

a second integrator for integrating an output signal of said first differentiator;

a first signal output unit for outputting a low-level signal when an integral in said second integrator falls below a first reference voltage;

a third integrator for integrating an output signal of said first signal output unit;

a second differentiator for outputting a difference between a binary signal based on an integral in said third integrator and an output signal of said first signal output unit;

a fourth integrator for integrating an output signal of said second differentiator;

a second signal output unit for outputting a high-level signal when an integral in said fourth integrator exceeds a second reference voltage;

an inverter for inverting and outputting an output signal of said second signal output unit; and an AND arithmetic unit for computing a logical product of an output signal of said inverter and the output signal of said first signal output unit.

5. The motor rotation irregularity detection circuit according to claim 4, further comprising:

a first voltage regulator for regulating said first reference voltage.

6. The motor rotation irregularity detection circuit according to claim 4, further comprising:

a second voltage regulator for regulating said second reference voltage.

* * * * *

UNITED STATES PATENT AND TRADEMARK OFFICE
CERTIFICATE OF CORRECTION

| | |
|---|---|
| PATENT NO. | : 8,138,698 B2 |
| APPLICATION NO. | : 12/498019 |
| DATED | : March 20, 2012 |
| INVENTOR(S) | : Kazumasa Nakai et al. |

It is certified that error appears in the above-identified patent and that said Letters Patent is hereby corrected as shown below:

The title page showing the illustrative figure should be deleted and replaced with attached title page.

In the drawings, delete Figs. 3A-3D, Fig. 4 and Fig. 5 and replace with the corrected drawings containing Figs. 3A-3D, Fig. 4 and Fig. 5 of the attached pages.

In the Specifications:
Column 7, line 47, change "U-level signal" to --H-level signal--.

Signed and Sealed this
Twenty-first Day of August, 2012

David J. Kappos
*Director of the United States Patent and Trademark Office*

(12) United States Patent
Nakai et al.

(10) Patent No.: US 8,138,698 B2
(45) Date of Patent: Mar. 20, 2012

(54) MOTOR ROTATION IRREGULARITY DETECTION CIRCUIT

(75) Inventors: Kazumasa Nakai, Tokyo (JP); Masayuki Ota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 490 days.

(21) Appl. No.: 12/498,019

(22) Filed: Jul. 6, 2009

(65) Prior Publication Data
US 2010/0019706 A1 Jan. 28, 2010

(30) Foreign Application Priority Data
Jul. 24, 2008 (JP) ................................ 2008-190417

(51) Int. Cl.
*H02P 6/16* (2006.01)
(52) U.S. Cl. ......... 318/400.04; 318/400.06; 318/400.32; 318/638
(58) Field of Classification Search .................. 318/638, 318/400.03, 400.04, 400.05, 400.06, 400.21, 318/400.32
See application file for complete search history.

(56) References Cited

U.S. PATENT DOCUMENTS

| | | | | |
|---|---|---|---|---|
| 3,569,808 A * | 3/1971 | Goto | | 388/820 |
| 3,668,492 A * | 6/1972 | Konishi et al. | | 388/820 |
| 4,999,557 A * | 3/1991 | Inoue | | 318/609 |
| 5,493,192 A * | 2/1996 | Nihei et al. | | 318/568.2 |
| 7,960,934 B2 * | 6/2011 | Benson et al. | | 318/564 |
| 2008/0042613 A1 | 2/2008 | Aizawa et al. | | |

FOREIGN PATENT DOCUMENTS
JP 9-166610 A 6/1997
JP 2008-11628 A 1/2008

* cited by examiner

*Primary Examiner* — Bentsu Ro
*Assistant Examiner* — Thai Dinh
(74) *Attorney, Agent, or Firm* — Birch, Stewart, Kolasch & Birch, LLP

(57) ABSTRACT

A motor rotation irregularity detection circuit includes a first integrator for integrating a rotation detection signal that is output from a driver of a sensor-less motor; a differentiator for outputting a difference between a binary signal based on the integral in the first integrator and the rotation detection signal; a second integrator for integrating an output signal of the differentiator; a comparator for making a comparison between the integral in the second integrator and a reference voltage to output an irregularity detection signal; and an output terminal for outputting a signal coming from the comparator.

6 Claims, 5 Drawing Sheets